United States Patent
Zhu (10) Patent No.: US 8,630,668 B2
(45) Date of Patent: Jan. 14, 2014

(54) SMS-BASED TRANSPORT FOR INSTANT CHATTING ON MULTIPLE PLATFORMS

(75) Inventor: Zhongwen Zhu, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 46 days.

(21) Appl. No.: 13/099,163

(22) Filed: May 2, 2011

(65) Prior Publication Data

US 2012/0282954 A1 Nov. 8, 2012

(51) Int. Cl.
*H04W 4/00* (2009.01)

(52) U.S. Cl.
USPC ............................................. 455/466

(58) Field of Classification Search
USPC ...................................... 455/466
See application file for complete search history.

(56) References Cited

U.S. PATENT DOCUMENTS

| | | | | |
|---|---|---|---|---|
| 6,085,100 | A * | 7/2000 | Tarnanen | 455/466 |
| 6,178,331 | B1 * | 1/2001 | Holmes et al. | 455/466 |
| 7,251,495 | B2 | 7/2007 | Keyani et al. | |
| 7,369,865 | B2 * | 5/2008 | Gabriel et al. | 455/466 |
| 7,403,607 | B2 | 7/2008 | Hession et al. | |
| 7,412,486 | B1 * | 8/2008 | Petrack et al. | 709/206 |
| 7,792,298 | B2 | 9/2010 | Silverbrook et al. | |
| 7,869,794 | B1 | 1/2011 | Weaver | |
| 7,877,079 | B2 | 1/2011 | Leppanen et al. | |
| 8,295,864 | B2 * | 10/2012 | Samaha | 455/466 |
| 2004/0082348 | A1 * | 4/2004 | Gabriel et al. | 455/466 |
| 2005/0078660 | A1 | 4/2005 | Wood | |
| 2007/0177568 | A1 * | 8/2007 | Clontz et al. | 370/349 |
| 2007/0217393 | A1 * | 9/2007 | Lee et al. | 370/352 |
| 2008/0130663 | A1 | 6/2008 | Fridman et al. | |
| 2008/0171549 | A1 | 7/2008 | Hursey et al. | |
| 2008/0200192 | A1 | 8/2008 | Harris | |
| 2008/0242327 | A1 * | 10/2008 | Gabriel et al. | 455/466 |
| 2008/0254770 | A1 | 10/2008 | Aaltonen et al. | |
| 2008/0287148 | A1 | 11/2008 | Silver et al. | |
| 2010/0091763 | A1 | 4/2010 | Thompson | |

(Continued)

FOREIGN PATENT DOCUMENTS

| | | |
|---|---|---|
| EP | 0 937 365 B1 | 1/2005 |
| EP | 1 613 102 A1 | 1/2006 |
| WO | 2008/052334 A1 | 5/2008 |
| WO | 2008/119883 A1 | 10/2008 |

OTHER PUBLICATIONS

SMS in Gmail Chat, http://googlesystem.blogspot.com/2008/10/sms-in-gmail-chat.html, Oct. 31, 2008, 2 pages.

(Continued)

*Primary Examiner* — Nathan Mitchell
(74) *Attorney, Agent, or Firm* — Ericsson Canada Inc.; Dilip C. Andrade (57) ABSTRACT

An instant messaging service is provided using short message service (SMS) messages as the underlying transport layer. A user having a phone associated with an MSISDN can use a client to generate messages that are then transmitted as if they originated from the phone. The SMS message is delivered to the second party's phone as per a normal SMS message. If the second party is also using a client, the client can retrieve messages addressed to the second party's MSISDN even though client does not need to be associated with the MSISDN. The use of SMS messages provides for a persistent and reliable transport layer, and also allows for fall back to SMS messaging for either party independently.

14 Claims, 7 Drawing Sheets

(56) References Cited

U.S. PATENT DOCUMENTS

| | | | |
|---|---|---|---|
| 2010/0130238 | A1 | 5/2010 | Kupsh et al. |
| 2010/0273450 | A1* | 10/2010 | Papineau et al. ............. 455/411 |
| 2011/0053618 | A1 | 3/2011 | Lin et al. |
| 2011/0080905 | A1 | 4/2011 | Greene et al. |
| 2011/0294481 | A1* | 12/2011 | Nzumafo ....................... 455/417 |
| 2012/0243686 | A1* | 9/2012 | Wesby ........................... 380/270 |
| 2012/0258745 | A1* | 10/2012 | Alanara et al. ................. 455/466 |

OTHER PUBLICATIONS

GSMA: Rich Communication Suite Release 4 Functional Description Version 1.0; Feb. 14, 2011; 36 pages.

OMA: Converged IP Messaging Requirements; Candidate Version 1.0; Oct. 12, 2010; OMA-RD-CPM-V1_0-20101012-C; 74 pages.

3GPP TS 23.204, V10.2.0: 3rd. Generation Partnership Project; Technical Specification Group Services and System Aspects; Support of Short Message Service (SMS) over generic 3GPP Internet Protocol (IP) access; Stage 2, (Release 10); Sep. 2010; 53 pages.

ETSI TS 123 142 V9.0.1: Digital cellular telecommunications system (Phase 2+); Universal Mobile Telecommunications System (UMTS); LTE; Value-added Services for SMS (VAS4SMS); Interface and signalling flow (3GPP TS 23.142 version 9.0.1 Release 9); Jan. 2010; 27 pages.

\* cited by examiner

SMS-BASED TRANSPORT FOR INSTANT CHATTING ON MULTIPLE PLATFORMS

TECHNICAL FIELD

This disclosure relates generally to the use of short-message service (SMS) messages as a delivery channel for a multi-platform instant messaging service.

BACKGROUND

Short Message Service (SMS) functionality is an existing part of a number of different mobile telephony standards. These messages are typically restricted to 160 character messages, and are transmitted through control channels in many mobile telephony networks. Users are often charged by their carrier for sending or receiving messages, although in many networks incoming messages are freely delivered, and many carriers also offer rate plans that provide for either unlimited messaging or a very high volume of messages in a fixed fee package.

Figure 1:
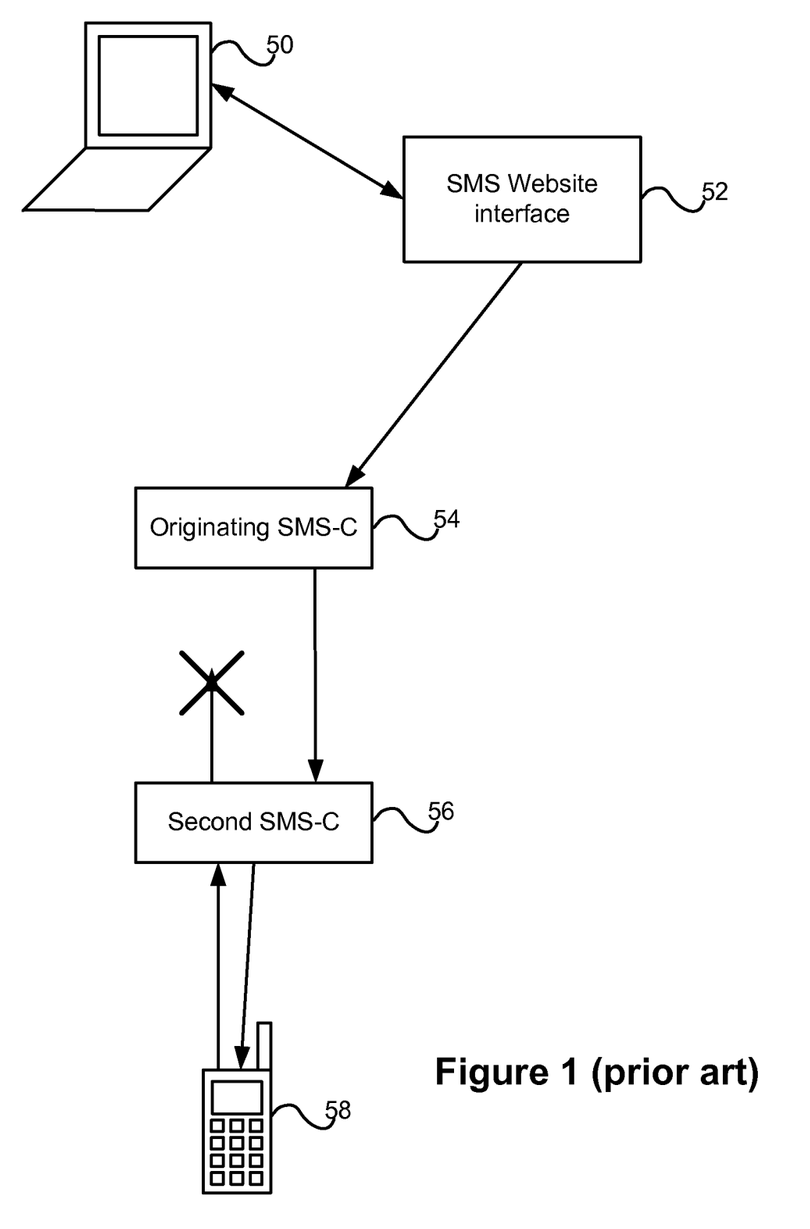
FIG. 1 is a block diagram illustrating a prior art system for delivery of SMS messages.

To provide SMS sending capabilities to people who do not want to use a mobile phone to send an SMS, any carriers provide an SMS sending service through a web-based interface. An example of such a service is shown in FIG. 1. Using a computer 50, a user interacts with a website 52 and provides both a destination phone number and a message to be sent. The message and phone number are relayed to an originating SMS-Centre (SMS-C) 54. This message may be provided directly or through an intermediate node and can be sent using one of a plurality of different protocols including hypertext transfer protocol (http), the simple mail transfer protocol (SMTP) and other conventional protocols that will be understood by those skilled in the art. The SMS-C 54 sends the SMS message to the terminating SMS-C 556 which is the SMS-C associated with the recipient handset 58. The SMS message is forwarded to handset 58, where it can be read by the recipient. In such systems, the sender address provided in the SMS message is a short code (a contact number typically 5 digits long) associated with the web-based portal, or associated with the carrier in general. A reply to the SMS that's sent to the sender address in this example will be considered undeliverable, and will be dropped by the terminating SMS-C 56.

Instant messaging services have proven to be very popular with a number of different market segments. Traditionally, these services have been single platform services that have relied on a data-packet based delivery channel. Among these popular services are Microsoft™'s MSN Messenger, and Yahoo!™'s Yahoo! Messenger. These platforms allow users to login to a server that tracks presence information about each user. By accessing the presence information associated with a list of contacts, users are able to find contacts that are online, and engage them in a chat session. One problem with these services that users experience is that they typically rely a client designed for the computing platform of choice, or are accessed through a webpage. When a user starts a chat session using a desktop computer, and then moves to a different platform, such as a mobile device, these services often treat the changeover as the start of a new chat session.

Some of these services have recognized the need to reach users that are not online, and thus allow users to send messages, through the chat server, to a phone number associated with a chat contact. In most of these systems, the setup is similar to the one shown in FIG. 1, but with the website 52 replaced with the chat server. As a result, it is possible to send a message to someone's mobile phone, but it is not possible for the recipient to either easily identify the sender of the message based on the addressing of the message or to reply to the message.

Figure 2:
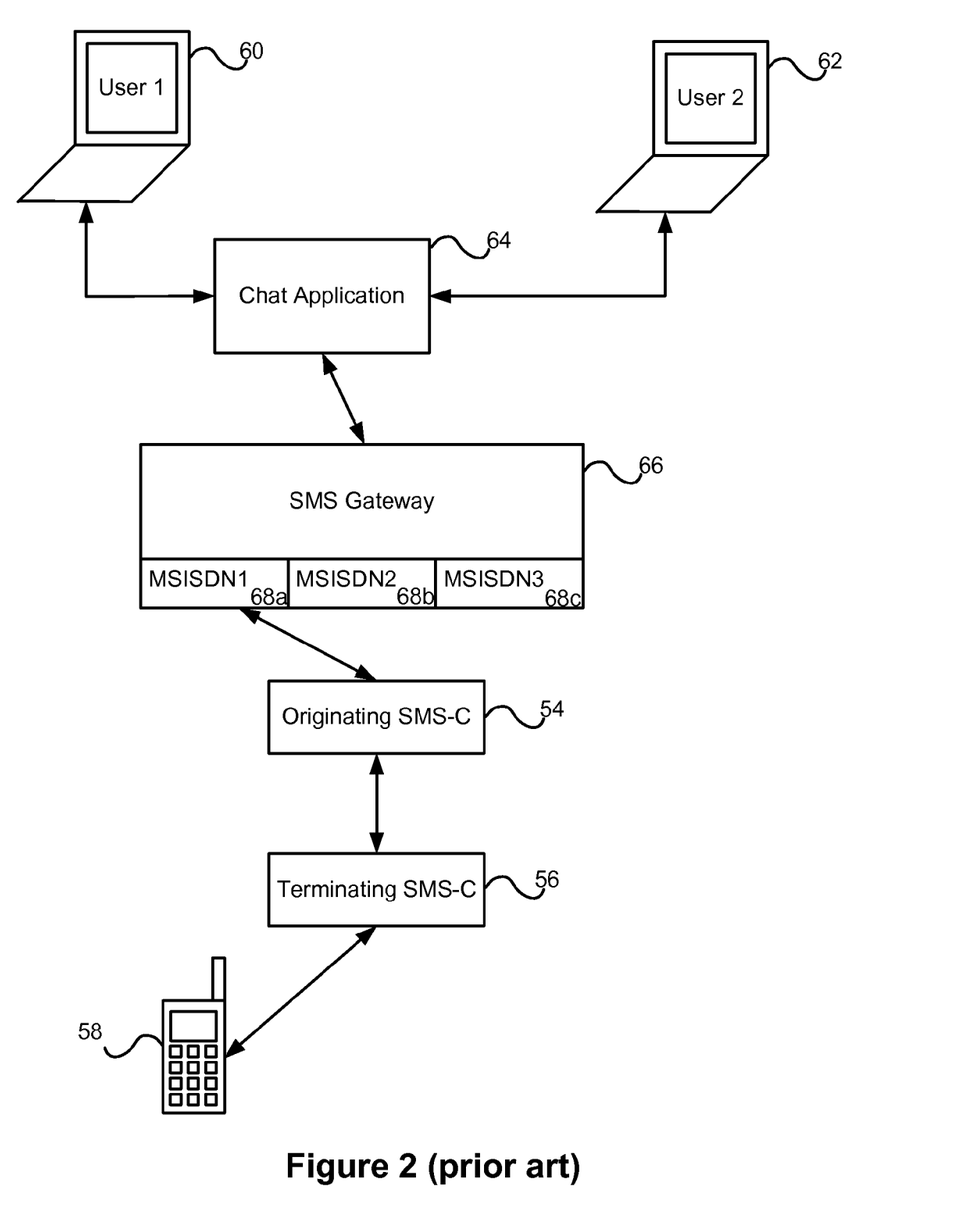
FIG. 2 is a block diagram illustrating a prior art system for transmitting chat messages to terminal having an MSISDN.

To address this problem, a solution has been offered as shown in FIG. 2. Computer 60 and computer 62 connect to each other through an application 64 that enables a chat service. Messages between the users are routed in a conventional fashion. If user 2 terminates the connection between computer 62 and chat application 64, user 1 at computer 60 sees the user log off the system. If user 1 has a profile for user 2 that includes a mobile phone number, a message can still be sent to chat application 64 from computer 60. The chat application 64 can determine based on stored presence information that user 2 is not available, and can then forward the received message to user 2 through and SMS message. The message is forwarded to SMS gateway 66. SMS gateway 66 has a plurality of Mobile Subscriber Integrated Services Digital Network (MSISDN) numbers associated with it, shown as MSISDN1 68a, MSISDN2 68b and MSISDN3 68c. The SMS gateway 66 creates a pairwise unique mapping between the MSISDN associated with user 2 and the MSISDN selected to send user 1's message (in this example MSISDN1 68a). This SMS message is then sent through originating SMS-C 54, to terminating SMS-C 56 and then to mobile device 58. User 2 will receive the message from a number that can be replied to. A reply is received by terminating SMS-C 56 and forwarded to the originating SMS-C 54 which delivers the message to SMS gateway 66 through a device associated with MSISDN1 68a. SMS gateway 66 can then determine based on the MSISDN the message was received over, and the MSISDN that the message was sent from, which user to deliver the message to. The message is then sent to user 1 on computer 60 through chat application 64.

This enables users to reach each other after a chat session has ended, but causes a series of different problems. Although the messages received on mobile device 58 can be replied to, based on the length of time that the pairwise unique mapping is maintained, MSISDN1 68a cannot be relied upon as a number that the mobile device 58 can associate with user 1. If the length of time is very large it would require the entity offering the chat application to maintain a large pool of MSISDN's which is very expensive, and then still requires that user 2 assign a phone number to user 1 that can only be used during a chat session. As such, it is impractical for user 2 to be able to use the sending MSISDN of an incoming message to identify the sender of the address. Furthermore, there is no context associated with the message, as there is no indication of the previous messages that were exchanged.

Other solutions to this problem have been to create chat clients for mobile devices that rely on a packet data delivery system. This is feasible on third generation (so-called 3G) networks and their successor networks (such as WiMax and LTE), but still requires that users subscribe to the service and that they maintain themselves as online using these services. This generates more data traffic, which is a double edged sword for carriers. Although a carrier is able to charge for the use of data services, building a sufficiently robust data network is difficult for many carriers in high demand environments. Furthermore, for many users this requires the addition of a data service which comes with an associated cost.

Many users have developed an affinity for the user of messaging services that offer the near instantaneous delivery of SMS messages on mobile platforms. Research In Motion™ has popularized device-to-device chatting though their Blackberry Messenger™ (BBM) service. This allows the delivery of instant messaging services between mobile user devices. This is properly thought of as a delivery of messages between devices, not between users as the underlying structure of the service makes use of a device specific address that is not typically portable to another device. As such, the messages cannot be delivered to another platform, and are delivered over the data packet network.

Some services, such as voice over IP services, allow a user to make use of a bridge between packet switched data services, such as the Internet, and circuit switched voice networks such as the Public Switched Telephone Network (PSTN). Some of these services allow a user to make outbound calls that are reported to the recipient as having originated at the MSISDN of another device. This allows a user to initiate a telephone call from a computer, and have the recipient see the caller id data associated with the caller's mobile phone. This is done through the control of the data provided in the Signaling System Seven (SS7) signaling channels. Skype™ provides such a service. Because these services recognize the need for their users to be able to have many different communication routes, many offer the ability for the user to send an SMS message. The delivery mechanism for these services is similar to that illustrated in FIG. 1, and the SMS messages are delivered with a sender address being a short code, which means that the user cannot reply to the received message by SMS.

Chat services in the existing art do not typically allow users to easily switch between platforms, and to offer users the ability to easily recognize who is sending a message they require the use of data services which may not be available to all users.

SMS messages provide a number of advantages to carriers. Whereas the delivery of data packets involves the use of an otherwise scarce resource (bandwidth assigned to data) SMS messages are often thought of as traveling for free. SMS messages are sent through dedicated control channels, and make use of otherwise unused bandwidth. The fact that they can be charged for only increases the interest that carriers have in their use. SMS messages have proven so popular that extensions are offered that allow devices to split a message that exceeds 160 characters into more than one message (so-called long SMS message), and allow the receiving devices to recognize these multi-part messages as single messages for display. Additionally, Multimedia Message Service (MMS) messages have also been offered that allow SMS messages to be used as a delivery mechanism for rich content such as photos and videos.

Therefore, it would be desirable to provide a system and method that allow carriers to leverage their investment in the SMS infrastructure to provide chat services to users on a plurality of different platforms.

SUMMARY

It is an object of the present invention to obviate or mitigate at least one disadvantage of the prior art.

In a first aspect of the present invention, there is provided a method of generating a Short Message Service (SMS) message. The method comprising the steps of validating a user as being associated with an Mobile Subscriber Integrated Services Digital Network Number (MSISDN) and transmitting a message to an SMS Centre for transmission as an SMS message from the MSISDN associated with the validated user.

In an embodiment of the first aspect, the method further includes the step of receiving from the user content with which the message transmitted to the SMS Centre is generated. In another embodiment, the method includes receiving a destination MSISDN from the user for use in addressing the generated message and optionally includes the step of formatting the generated message in a pre-arranged format. In another embodiment, the step of transmitting includes transmitting the message to an intervening node with a request to relay the message to the SMS-C, and the message is formatted using Simple Object Access Protocol and transmitted to a carrier node for authorization prior to being forwarded to the SMS Centre.

In a second aspect of the present invention, there is provided a method of transmitting a message as a Short Message Service (SMS) message. The method comprises receiving a message from a trusted node containing a message for transmission as an SMS message from a specified Mobile Subscriber Integrated Services Digital Network Number (MSISDN) and transmitting the contained message to a destination on behalf of the specified MSISDN.

In an embodiment of the second aspect, the method further includes validating that the trusted node is authorized to request transmission of messages on behalf of the specified MSISDN. In a further embodiment, the received message includes a destination MSISDN, and the step of transmitting includes addressed the contained message to the destination MSISDN.

In a third aspect of the present invention, there is provided a method of delivering a Short Message Service (SMS) message addressed to a destination Mobile Subscriber Integrated Services Digital Network Number (MSISDN). The method comprises receiving an SMS message addressed to the destination MSISDN; and forwarding the received SMS message to a node not assigned the destination MSISDN for display to a user.

In embodiments of the third aspect the method includes receiving, in advance of the receipt of the SMS message, a request from the node not assigned the destination MSISDN for notification of receipt of an SMS message addressed to the destination MSISDN. Prior to the step of forwarding, the method can further include transmitting a notification message to the node not assigned the destination MSISDN, and forwarding the received SMS message to a network storage solution accessible to the node not assigned the destination MSISDN.

In a fourth aspect of the present invention, there is provided a method of handling Short Message Service (SMS) messages addressed to an MSISDN not associated with a current node. The method comprises receiving a message containing an SMS message addressed to an MSISDN not associated with a current node; and transmitting the received message to a node not assigned the MSISDN, for display to a user associated with the MSISDN to which the SMS message is addressed. The step of receiving can optionally be preceded by issuing a request to an SMS Centre associated with the MSISDN for notification of receipt of an SMS message addressed to the MSISDN, and optionally can include issuing a request to a network storage solution for the SMS message in response to receipt of the requested notification.

In a fifth aspect of the present invention, there is provided a node for handling Short Message Service (SMS) messages addressed to an Mobile Subscriber Integrated Services Digital Network Number (MSISDN) not assigned to the node. The node comprises a user interface, an SMS interface, a validation engine and a messaging engine. The user interface allows communication with a user associated with an MSISDN. The SMS interface allows communicating with an SMS Centre. The validation engine receives user credentials from the user over the user interface, and validates that the user is authorized to transmit messages from the MSISDN. The messaging engine receives message content from the user and formats the message content for transmission to the SMS Centre through the SMS interface with a request that the message be transmitted on behalf of the MSISDN that the user is validated as authorized to transmit messages from. In an embodiment of this aspect, the messaging engine is operatively connected to the SMS interface for receiving from the SMS interface, SMS messages addressed to the MSISDN that the user is validated against, and for transmitting these messages to the user.

In a sixth aspect of the present invention, there is provided a Short Messaging Service (SMS) Centre. The SMS Centre comprises an SMS interface, a network storage solution interface, an active address book interface and a message generation engine. The SMS interface sends and receives SMS messages with a second SMS Centre. The network storage solution interface allows transmission of received SMS messages to a network storage solution. The active address book interface receives messages sent by a user associated with a Mobile Subscriber Integrated Services Digital Network Number (MSISDN), from a node not assigned the MSISDN associated with the user. The message generation engine generates an SMS message in accordance with messages received over the active address book interface and transmits these messages on behalf of the MSISDN associated with the user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for using SMS messages as a delivery mechanism for instant message chats.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

In the following discussion, methods and systems for providing chat type services will be discussed in the context of an SMS-based transport layer. Although the following discussion is based around users making use of a web-based chat client, any user client can be used. Clients can be specifically designed to work with a variety of computer operating systems, including mobile device operating systems. Although the discussion below focuses on a single non-mobile device interface, this is done for the sake of simplicity and it should be understood by those skilled in the art that other interfaces to the system described below can be implemented without departing from the scope of the present invention.

SMS messaging is a reliable and convenient transport mechanism for messages. The SMS delivery infrastructure can be leveraged to provide message transport layer for an instant messaging system. A non-mobile phone interface can provide a mechanism for both sending and receiving messages associated with an MSISDN that is assigned to a handset associated with a user. When messages are sent, they are preferably addressed from the MSISDN associated with the user. Thus, a recipient will receive the messages and they will appear as being sent from the sender's phone number. This allows the recipient to reply to the message and have the messages routed to the original sender's phone. In a further refinement, the SMS message can be relayed back to the non-mobile phone interface. Two users using the non-phone interface will be able to have a live chat session without needing to interact through their mobile phones. If one of the parties leaves the computer, the chat can continue as the messages are directed to the MSISDN associated with each party, so the SMS messages will still be delivered to the phone. Replies from the phone will still be delivered to the other party.

Some carriers offer a service referred to as an active address book. This service allows users to access an online service that provides the user the ability to synchronize contact information with a server provided by the carrier. Through these services, the user is able to make use of a series of different services. The interface to the active address book is often a web-based interface, and it is often useful to provide the user with the ability to send SMS messages to contacts in the active address book from the web-based interface. The ability to use a full keyboard, and have access to a secure address book to select the people to whom to send the message are often seen as benefits of this service. As part of the use of an active address book, users are required to login to a secure server. This is sufficient proof to the carrier that the user of a service is associated with the subscriber associated with an account. The subscriber's account is also associated with an MSISDN.

Figure 3:
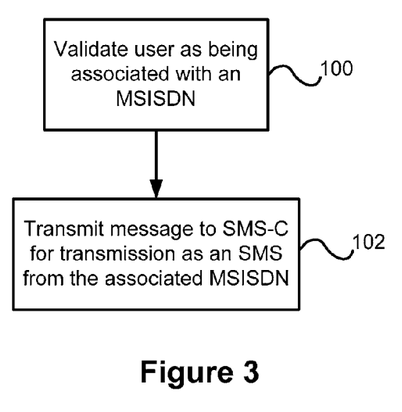
FIG. 3 is a flow chart illustrating a method of the present invention.

FIG. 3 is a flowchart illustrating a method of enabling transmission of messages from an interface not associated with an MSISDN to a second MSISDN (the recipient MSISDN). In step 100, a user is validated as being associated with an MSISDN. In step 102, a message is transmitted to the SMS-C associated with the MSISDN for transmission. The message instructs the SMS-C to transmit an SMS on behalf of the MSISDN, and may optionally include information indicating that the user associated with the MSISSN was authorized. One skilled in the art will appreciate that the validation of the user can be done using a variety of different techniques including verification of a password, exchange of shared secret, or other such techniques that will be apparent to those skilled in the art.

Figure 4:
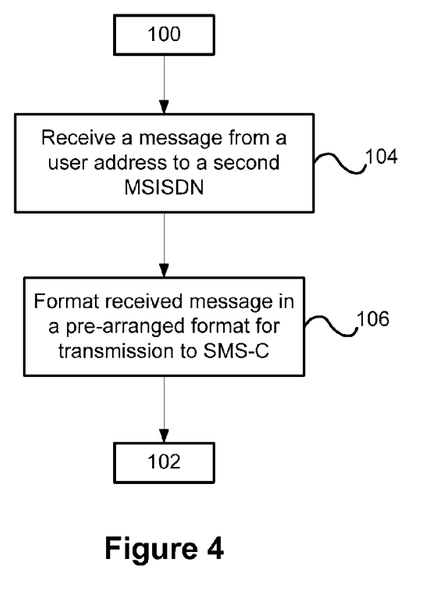
FIG. 4 is a flow chart illustrating a method of the present invention

FIG. 4 illustrates the method of FIG. 3 with exemplary steps for use in further embodiments. Following step 100 as described above, the SMS interface, having validated the user, receives a message from a user addressed to a second MSISDN. The addressing of the message providing MSISDN may directly provide the MSISDN, or it may indicate contact information stored by the user that includes an MSISDN. In step 106, the received message is formatted in a pre-arranged format for transmission to the SMS-C. In some embodiments the message will be formatted using http, in others SMTP will be used. One skilled in the art will appreciate that the message can be relayed either directly to a first SMS-C, or it can be sent to another node for a variety of different purposes, including verification that the user authorized the account to transmit SMS messages using the MSISDN as a return address, and optionally for billing purposes. In some embodiments, the non-SMS interface is an active address book that receives messages from the validated user using http, and makes use of Simple Object Access Protocol (SOAP) to send messages to the carrier network infrastructure. These SOAP messages are received and processed to ensure compliance with user policies and then the SMS messages are relayed to the first SMS-C using SMTP. Upon completion of step 106, the process continues with step 102 as described above.

Figure 5:
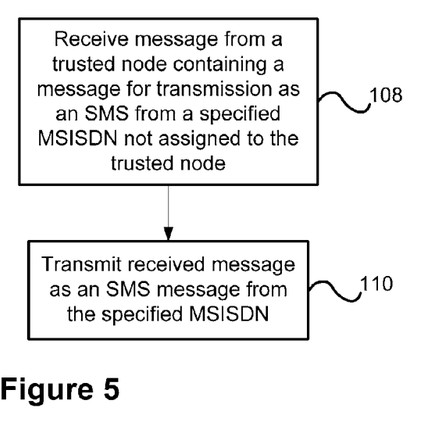
FIG. 5 is a flow chart illustrating a method of the present invention.

FIG. 5 illustrates a method of receiving messages for transmission at the first SMS-C. In step 108, the SMS-C receives a message from a trusted node. This message contains a message for transmission as an SMS message from a specified MSISDN. This MSISDN is not associated with the trusted node from which the message is received. After receiving the message in step 108, the SMS-C transmits the received message as an SMS message from the specified MSISDN in step 110. From the first SMS-C (the originating SMS-C in this described embodiment) the message is routed to the second SMS-C (the terminating SMS-C) and from there to the MSISDN that the SMS message is addressed to. This delivery of the message transmitted from the specified MSISDN to the mobile device associated with the destination MSISDN can be carried out using conventional SMS handling techniques as will be understood by those skilled in the art.

One skilled in the art will appreciate that in step 110, the message preferably includes a second MSISDN to which the message is to be delivered. Furthermore, the message can be received using any of a number of protocols including, but not limited to, http and SMTP. The message can be received either directly from the trusted node, or it can be received through an intervening node.

The transmission of SMS message according to the above described embodiment facilitates sending messages and having them include, as the sender's address, an MSISDN associated with the user, but not associated with the node from which the message is sent. This allows the recipient to both identify the incoming message based on its addressing, and to reply to the message without any problems.

When the second user (the recipient of the first message replies), a conventional SMS delivery route would have the SMS message delivered to the second SMS-C (which in the first scenario was the terminating SMS-C) which then forwards the message tot the SMS-C associated with the destination address of the reply, which is the first SMS-C. The message is then delivered to the mobile device associated with the MSISDN that the original message was addressed as originating from.

A further modification to the delivery of an SMS message will now be discussed that enables the message to be delivered to another system, such as the active address book. Delivery of the SMS message to both the handset and the computer interface allows the user to select which device the conversation can continue on, and will also enable the user to receive, read and reply to the message from another system, such as a desktop computer with a larger screen and a more complete keyboard.

When an SMS message is received by a terminating SMS-C (the SMS-C associated with the MSISDN that the SMS message is addressed to), the message is typically delivered to both the mobile device and to a network storage solution (NSS). The NSS allows for messages to be properly stored for later retrieval if the message is not properly delivered, or simply for archiving. In the embodiment discussed below, the client software used to interact with the system is provided access, either to the SMS-C or to the NSS. This connection allows SMS messages addressed to an MSISDN associated with a user to be retrieved by an active session with the client (such as the active address book) and then displayed to the user.

Figure 6:
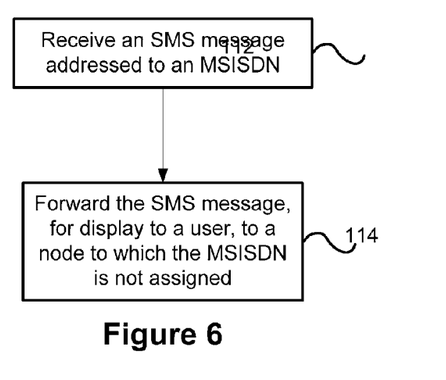
FIG. 6 is a flow chart illustrating a method of the present invention.

In FIG. 6, the method commences in step 112 with receipt of an SMS message addressed to an MSISDN. In step 114, the received SMS message is forwarded to a node other than the node that the MSISDN is assigned to. This forwarding of the SMS message is done to facilitate display of the message to a user. In such a method, the SMS message is typically received using conventional SMS exchange protocols. The delivery of the SMS in parallel to the handset associated with the MSISDN is outside the scope of the present invention, and there is no reason that the message cannot be delivered to both platforms in parallel.

In some embodiment, prior to forwarding the SMS message for display in step 114, the SMS-C receives a request from the node that the MSISDN is not assigned to, requesting either a copy of received messages, or requesting notification of receipt of messages.

Figures 7, 8:
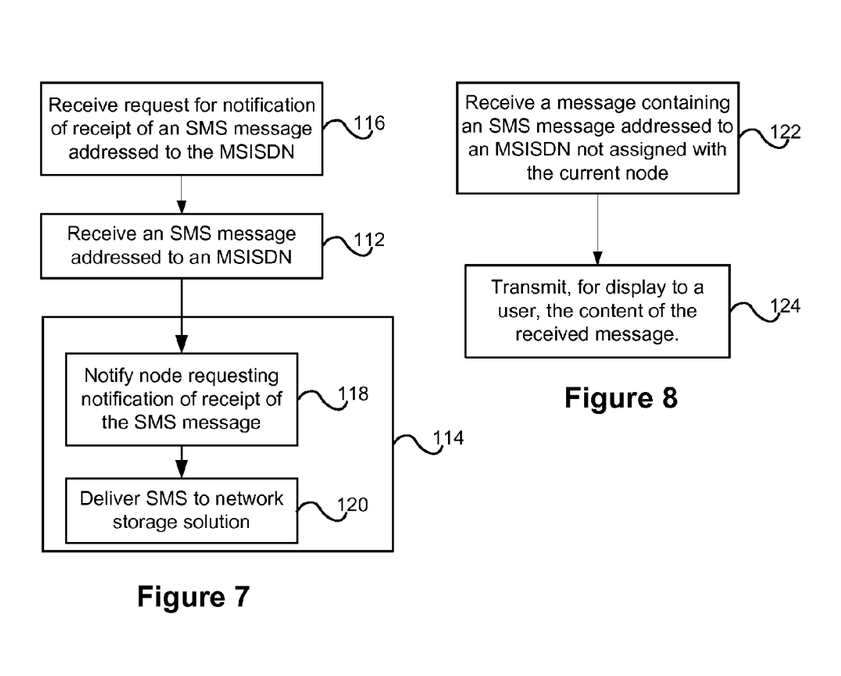
FIG. 7 is a flow chart illustrating a method of the present invention.
FIG. 8 is a flow chart illustrating a method of the present invention.

As shown in FIG. 7, the method of FIG. 6 can be modified so that prior to the receipt of the SMS message in step 112, the SMS-C receives a request for notification of receipt of an SMS message addressed to a specified MSISDN, as shown in step 116. In the exemplary embodiment of FIG. 7, the step of forwarding the message in step 114 is carried out by first, in step 118, notifying the requesting node of the receipt of an SMS message. The SMS message is then delivered to the NSS, where it is retrieved by the requesting node for display to the user in step 120. One skilled in the art will appreciate that either in parallel or in series with the forwarding of the message to the NSS, the message can also be relayed to the mobile device associated with the MSISDN.

Requests from the node to which the MSISDN is not assigned, preferably include authentication information that verifies that the node is not assigned the MSISDN, but is authorized by a user associated with the MSISDN to retrieve these messages. The requests can be received over an existing protocol such as SIP, http, or another protocol that will be well understood by those skilled in the art. In an alternate embodiment, the delivery of the message is done directly to the requesting node in response to the request. The request for notification can be done in many different ways, including a long poll, or can be done with an instruction to employ a push technique to provide the notification. The notification can either tell the node where the message can be retrieved, or the notification can include the received message which would allow for the NSS to be removed from the loop.

Figure 9:
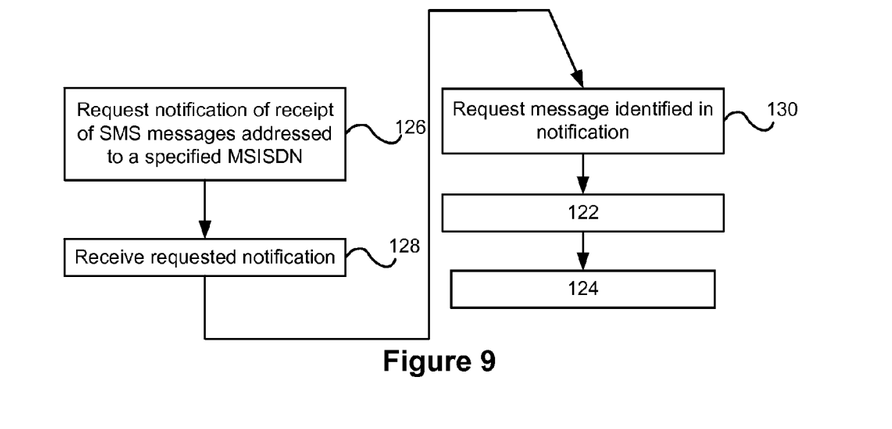
FIG. 9 is a flow chart illustrating a method of the present invention.

FIG. 8 illustrates the counterpart method to those shown in FIGS. 6 and 7 from the perspective of the node that is retrieving the SMS messages but is not assigned the MSISDN. It should be noted, as a quick aside, that the node that receives the SMS messages and is assigned the MSISDN is not necessarily doing anything novel, as it is the mobile phone that has the MSISDN as its phone number. In step 122, a message is received containing an SMS message addressed to an MSISDN. The MSISDN can be used as a key in a lookup table to determine the user to whom the message is addressed. The received message can then be forwarded for display to the user in step 124. One skilled in the art will appreciate that, as illustrated in FIG. 9, the method of FIG. 8 may be preceded by either a registration message requesting that SMS messages addressed to the MSISDN be forwarded, or by a polling request asking for notification of receipt of SMS messages addressed to the MSISDN as shown in step 126. After requesting notification in step 126, notification is received in step 128, and an explicit request, either from the node that provided the notification, or from another node, for a copy of the received SMS message is issued in step 130. The transmission of the message for display can be done using conventional protocols such as http, or other protocols that will be apparent to those skilled in the art. In some embodiments, the message is only forwarded for display if there is an active session with the user that can be validated as being associated with the MSISDN.

Figure 10:
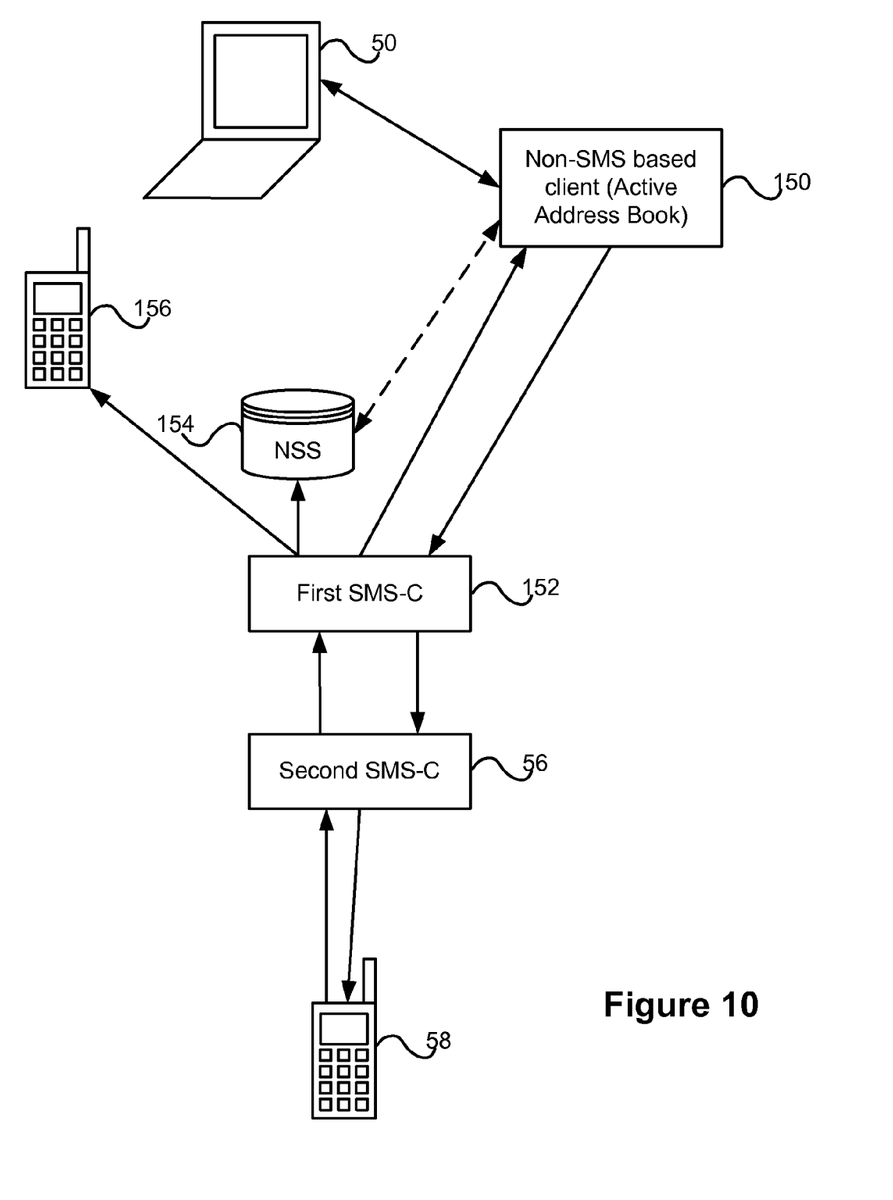
FIG. 10 is a block diagram illustrating a system carrying out methods of the present invention.

FIG. 10 illustrates a system involving the nodes and interconnections discussed with relation to the methods shown in the above-described figures. Through computer 50, a user connects to the active address book 150, and performs a validation that authenticates the user against stored credentials. This validation allows the non-SMS based client (AAB 150) to validate that the user is associated with the MSISDN. A message received by AAB 150 is then sent to the first SMS-C 152 with instructions to transmit the message as an SMS message to a specified MSISDN with a sender address corresponding to the MSISDN that is associated with the user. As noted above, the connection between nodes 150 and 152 can either be direct, as shown in FIG. 10, or it can be sent through an intermediate node.

The SMS message can then be forwarded according to conventional means to the second SMS-C 56, and to the handset 58. At the handset the message is received as if it had been sent from the MSISDN that the user authenticated against. This allows the recipient device 58 to reply using a simple SMS message. The reply message is received by the second SMS-C 56, and forwarded to the first SMS-C 152. The message is relayed to both the MSISDN associated with the user at handset 156, and to the network storage solution (NSS) 154. First SMS-C 152 then provides an indication to AAB 150 that a message was received for the associated MSISDN. This notification can include the received message, or it can be a cue to the AAB 150 to retrieve the message. AAB 150 can retrieve the message either from SMS-C 152 or from NSS 154. In this manner, AAB 150 will receive a copy of the SMS message provided to mobile device 156 and will be able to display the message through an active session on computer 150.

One skilled in the art will appreciate that the use of SMS messages as a delivery channel allows for participants in a chat session to use an non-SMS client to send messages, and through user validation the messages will be transmitted on behalf of the MSISDN. This allows the received message to appear as if it was sent by the mobile phone of the first participant. The received message can be forwarded to the non-SMS client by the SMS-C, either directly or through the NSS. Thus two users can carry out a chat without using their phones, but if either of the two participants, or both, had to leave the terminal from which the client was accessed, the chat could be continued as there would be a seamless transition to simple SMS messaging. One skilled in the art will appreciate that multi-part SMS messages used for transmitting long messaged, and other such SMS extensions (including but not limited to enhanced message service (EMS) and MMS messaging) can be used without departing from the scope of the present invention.

Figure 11:
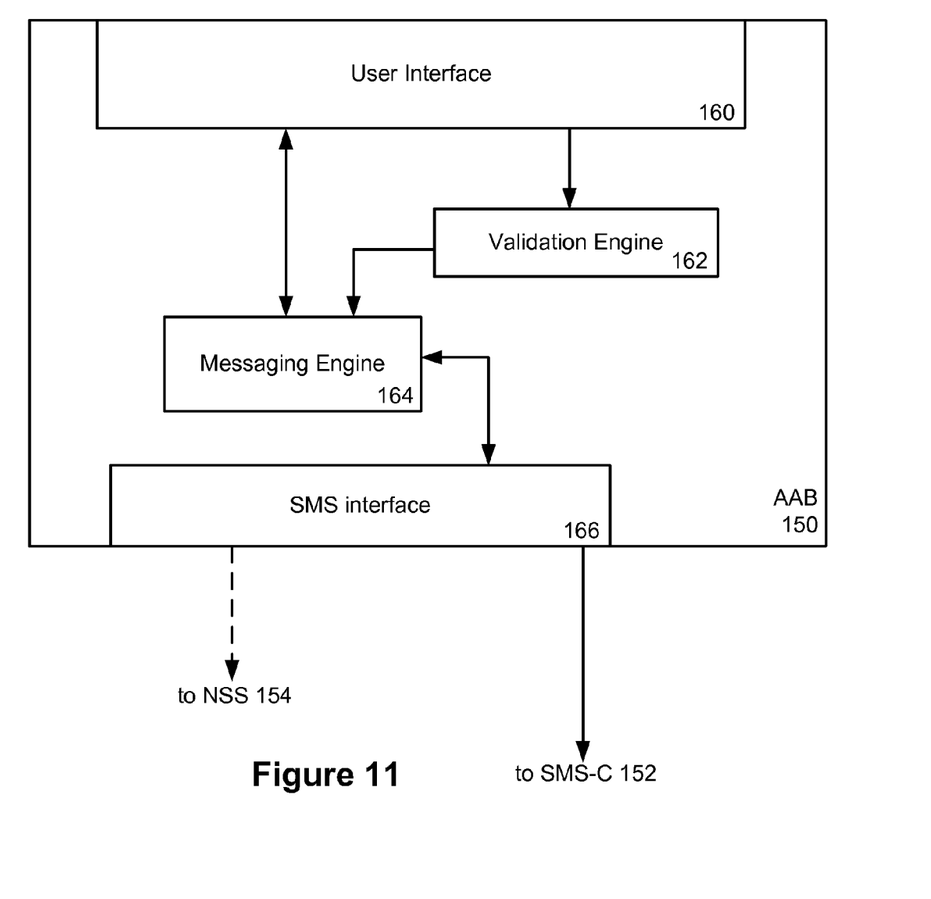
FIG. 11 is a block diagram illustrating a node for displaying and managing SMS messages addressed to an MSISDN not assigned to the node.

FIG. 11 illustrates an exemplary embodiment of an interface node such as active address book 150. AAB 150 includes a user interface 160 through which a user can interact with AAB 150. The user can provide validation credentials to validation engine 162 through user interface 160. Validation engine 162 can then validate that the user is associated with a particular MSISDN. The validated MSISDN is provided to the messaging engine 164, which also receives content for a message from the user along with a destination MSISDN. The messaging engine 164 then sends a message through SMS interface 166 to the SMS-C 152 instructing that the SMS-C 152 sends a message based on the received content on behalf of the validated MSISDN to the destination MSISDN. One skilled in the art will appreciate that the message sent through SMS interface 166 can include any of a number of different SMS-type messages including multi-part SMS messages, MMS messages and other such messages as have been discussed above.

SMS interface 166 also serves to receive indications from the SMS-C 152 that a message to the validated MSISDN has been received. Messaging engine 164 can then retrieve the message, either from SMS-C 152 or from NSS 154, interacting with either of these nodes through the SMS interface 166. One skilled in the art will appreciate that the connection between SMS interface 166 to the other nodes may pass through an intervening node depending on the particular implementation. Upon receiving the incoming SMS message, Messaging engine 164 can then provide that message to the user through user interface 160.

Figure 12:
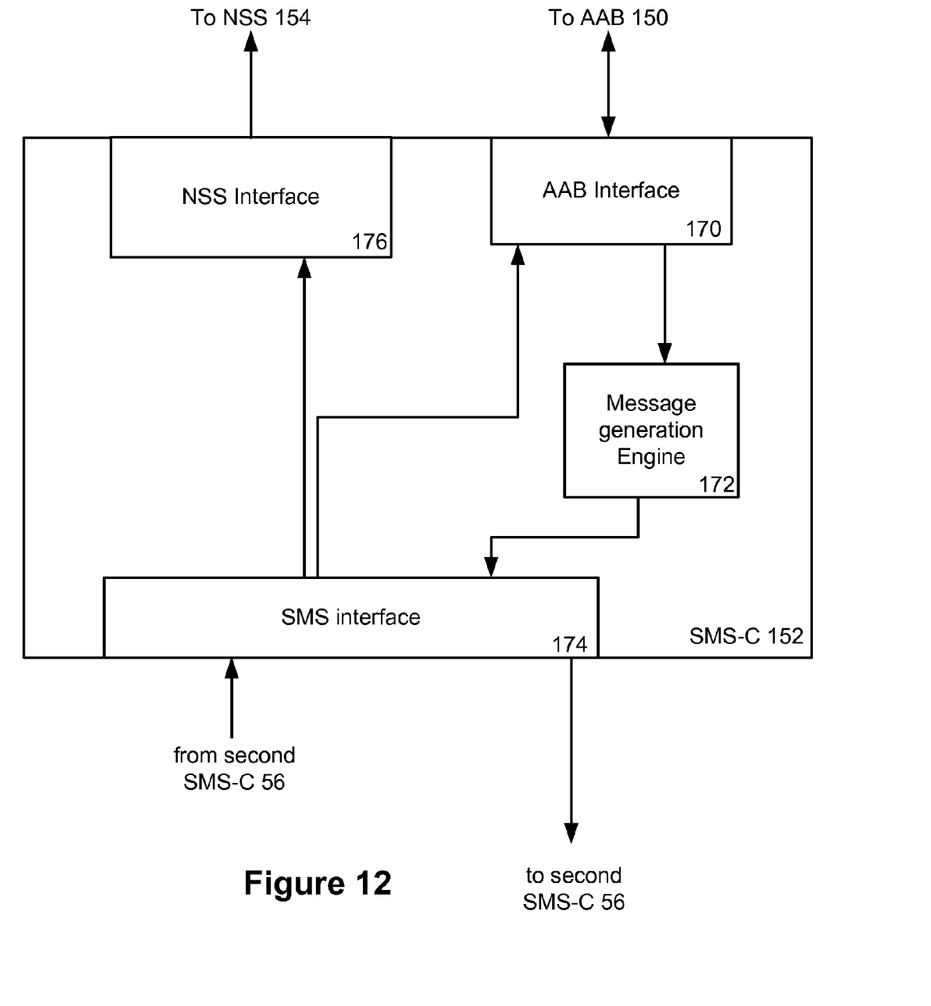
FIG. 12 is a block diagram illustrating a node for routing SMS messages to nodes not assigned the MSISDN associated with the SMS messages.

FIG. 12 illustrates an exemplary embodiment of an SMS-C node 152 having an interface to AAB 150. SMS-C 152 receives a message from AAB 150 through AAB interface 170. Messages received through this interface can either be assumed to have been received from a trusted node, or can be validated as having been received from a trusted node. The messages can be received in a number of different formats, including http and SMTP. In addition to receiving messages for transmission as SMS messages over AAB interface 170, interface 170 can be used to receive requests for notification of received SMS messages associated with a specified MSISDN. The received messages are provided to message generation engine 172 which formats the message received over AAB interface 170 as an SMS message, which is then relayed to the terminating SMS-C 56 through SMS interface 174. When a message is received addressed to the specified MSISDN, the SMS interface can forward a notification to AAB 150 through AAB interface 170. This notification can allow AAB 150 to request a copy of the SMS message, either from SMS-C 152 or through NSS 154 which is sent a copy of the received SMS message through NSS interface 176. Those skilled in the art will appreciate that SMS-C 152 has other functionality not shown that is common in the art, including the mechanisms used to deliver the SMS messages to the device associated with the MSISDN.

Those skilled in the art will appreciate that the nodes shown in FIGS. 11 and 12 may make use of a network interface to interact with different nodes. In some cases a single network interface can be re-used for different logical interfaces. The engines employed in these nodes can be provided in dedicated hardware, as firmware or software executed on general purpose hardware or any mix of the two. A single processor can be used to instantiate the required instances of the engines illustrated in the figures without departing from the scope of the present invention.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of generating a Short Message Service (SMS) message, the method comprising:
receiving a message including a source Mobile Subscriber Integrated Services Digital Network Number (MSISDN) and a destination MSISDN from a node not associated with the source MSISDN;
validating a user associated with the received message as being uniquely associate with the source MSISDN; and
transmitting a message determined in accordance with the received message to an SMS Centre (SMS-C) for transmission to the destination MSISDN as an SMS message from the source MSISDN.

2. The method of claim 1 further including the step of formatting the generated message in a pre-arranged format.

3. The method of claim 1 wherein the step of transmitting includes transmitting the message to an intervening node with a request to relay the message to the SMS-C.

4. The method of claim 3 wherein the message is formatted using Simple Object Access Protocol and transmitted to a carrier node for authorization prior to being forwarded to the SMS Centre.

5. A method of transmitting a message as a Short Message Service (SMS) message, the method comprising:
receiving, at an SMS Center, a message from a trusted node containing a message for transmission as an SMS message from a specified Mobile Subscriber Integrated Services Digital Network Number (MSISDN), the MSISN being assigned to a node other than the trusted node; and
transmitting the contained message to a destination on behalf of the specified MSISDN.

6. The method of claim 5 further including the step of validating that the trusted node is authorized to request transmission of messages on behalf of the specified MSISDN.

7. The method of claim 5 wherein the received message includes a destination MSISDN, and the step of transmitting includes addressing the contained message to the destination MSISDN.

8. A method of delivering a Short Message Service (SMS) message addressed to a destination Mobile Subscriber Integrated Services Digital Network Number (MSISDN), the method comprising:
receiving a request from a node not assigned the destination MSISDN to provide notification of receipt of an SMS message addressed to the destination MSISDN;
receiving an SMS message addressed to the destination MSISDN; and
forwarding at least one of notification of the received SMS message and the received SMS message to the node not assigned the destination MSISDN for display to a user.

9. The method of claim 8 wherein the step of forwarding includes forwarding the received SMS message to a network storage solution accessible to the node not assigned the destination MSISDN.

10. A method of handling Short Message Service (SMS) messages addressed to an MSISDN not associated with a current node, the method comprising:
issuing a request to an SMS Center associated with the MSISDN for notification of receipt of an SMS message addressed to the MSISDN;
receiving a message containing an SMS message addressed to an MSISDN not associated with a current node; and
transmitting the received message to a node not assigned the MSISDN, for display to a user associated with the MSISDN to which the SMS message is addressed.

11. The method of claim 10 further including issuing a request to a network storage solution for the SMS message in response to receipt of the requested notification.

12. A node for handling Short Message Service (SMS) messages addressed to an Mobile Subscriber Integrated Services Digital Network Number (MSISDN) not assigned to the node, the node comprising:
a user interface for communicating with a user associated with an MSISDN at a node not associated with the MSISDN;
an SMS interface for communicating with an SMS Centre;
a processor for executing stored instructions; and
a memory for storing instructions that when executed by the processor cause the node to:
validate user credentials received from the user over the user interface to determine that the user is authorized to transmit messages from the MSISDN; and
format message content received from the user for transmission to the SMS Centre through the SMS interface with a request that the message be transmitted as an SMS message originating at the MSISDN that the user is validated as authorized to transmit messages from.

13. The node of claim 12, wherein the processor is operatively connected to the SMS interface for receiving from the SMS interface, SMS messages addressed to the MSISDN that the user is validated against, and for transmitting these messages to the user.

14. A Short Messaging Service (SMS) Centre comprising:
an SMS interface for sending and receiving SMS messages with a second SMS Centre;

a network storage solution interface for transmitting received SMS messages to a network storage solution;

an active address book interface for receiving messages sent by a user associated with a Mobile Subscriber Integrated Services Digital Network Number (MSISDN), from a node not assigned the MSISDN associated with the user;

a processor for executing stored instructions; and a memory for storing instructions that when executed by the processor cause the SMS Centre to:
generate an SMS message in accordance with messages received over the active address book interface and
transmit the generated SMS message as an SMS message originating at the MSISDN associated with the user.

* * * * *